Aug. 12, 1947.  H. KONET  2,425,541
PHOTOELECTRIC DRIFT INDICATOR
Filed July 3, 1944
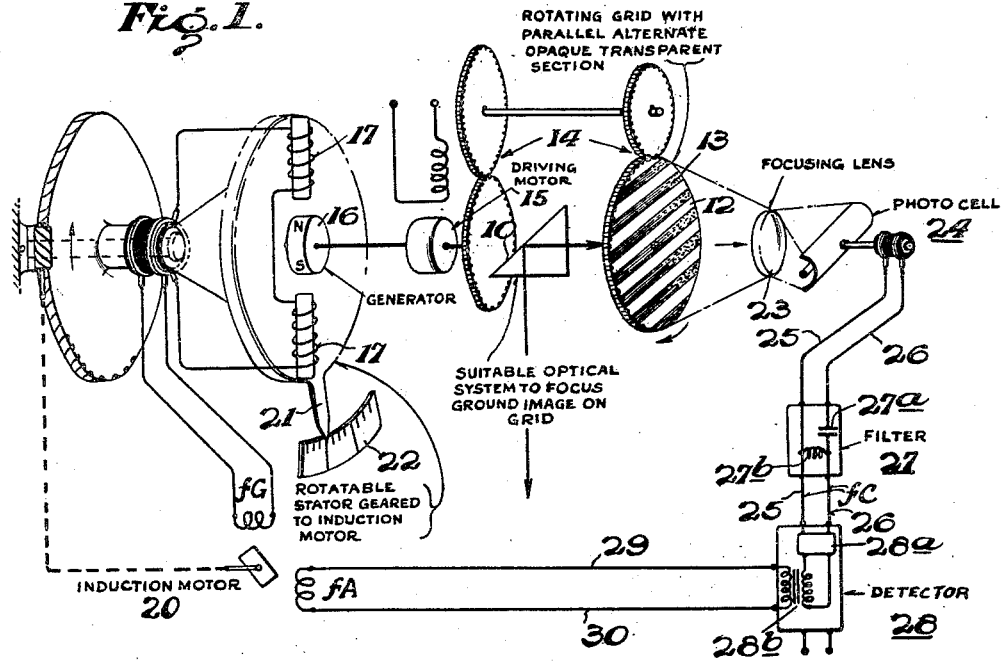
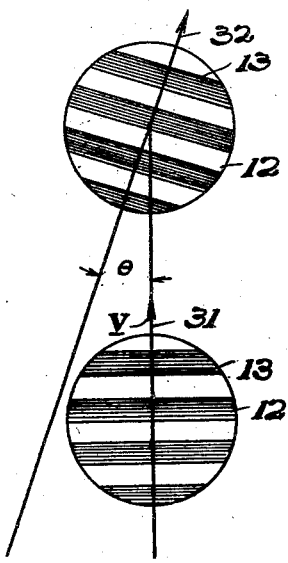
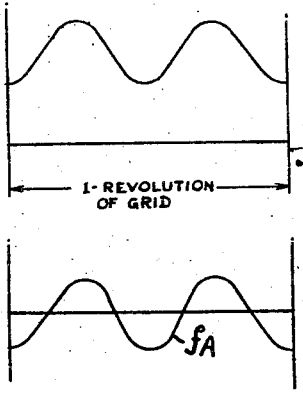
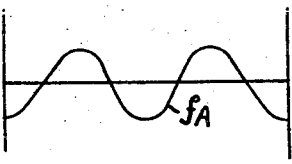
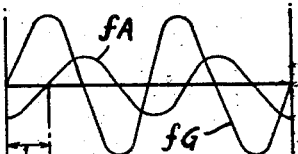
INVENTOR.
Henry Konet.
BY
Charles M. Funkhouser
ATTORNEY Patented Aug. 12, 1947

2,425,541

UNITED STATES PATENT OFFICE 2,425,541

PHOTOELECTRIC DRIFT INDICATOR

Henry Konet, Paramus, N. J., assignor to Bendix Aviation Corporation, Teterboro, N. J., a corporation of Delaware Application July 3, 1944, Serial No. 543,358

16 Claims. (Cl. 177—352)

The present invention relates generally to navigational instruments and more particularly to driftmeters. This application is a continuation in part of my application Serial No. 500,439, filed August 28, 1943, containing all of its subject matter and only additional subject matter conforming therewith.

In navigating aircraft so as to maintain a set heading, it is necessary to have a constant and reasonably accurate knowledge of angular drift of the path of travel or track followed by the craft to the right or left of the set heading. This, of course, is necessary in view of the fact that although the plane is pointed along the set heading it always actually moves along a "track" which may be or may become angularly disposed from the set heading. Navigators are trained to calculate such angular variations of the craft's path to left or right of the heading based on certain known factors. Even the most experienced navigators, however, require a certain grace period for their calculations, which divides their time with other important duties, important to the proper navigation of an aircraft. Also, where the pilot and navigator are one and the same, still further hardship is imposed without simplification of the usual methods of drift angle calculation or the like.

Accordingly, it is an object of the present invention to provide a novel means for giving a substantially continuous automatic indication of drift angle to thereby materially simplify a navigator's or a pilot's duties in this respect.

A further object of the present invention is to provide a simple, novel and easily manufactured automatic driftmeter, whereby any drift from a set course or heading will be continuously and automatically transmitted independent of manual control or preliminary mental calculations.

A further object is to provide a novel continuously indicating driftmeter for aircraft, whereby objects below the craft cooperate to set up continuous electric impulses to control an electrically operated polyphase indicator means.

Another object is to provide a novel automatic means to indicate drift angles, whereby a polyphase indicating system normally in synchronism with the drift angle between heading and path of travel is temporarily moved out of synchronism when said path of travel deviates from any prior path of travel with respect to heading, to thereby give an indication of drift angle predetermined proportionately to the resulting change of phase produced by such path of travel deviation with respect to heading.

A further object of the present invention is to provide a novel automatic drift indicator set for continuous indications of drift including a scanning disc and a filter whereby the novel arrangement and combination of elements and circuits provided serve to pass signal impulses to a polyphase indicator with the filtered output varying sinusoidally with the scanning disc rotation with respect to each path of travel of a craft, over the ground, on which the instrument is mounted to produce a governing action for the indicator in proportion to the drift from a previously set heading.

Related objects are, broadly, to provide novel methods of and means for measuring or controlling a variable physical condition in which a second variable such as frequency is cyclically set up to govern a phase difference in proportion to the value of the first variable and in which the phase difference governs the rotation of a polyphase motor which actuates a final element.

A further specific object is to provide an instrument of this class with a novel means for oscillating a frequency range to set up a phase angle related to the independent variable.

The above and other objects and advantages of the present invention will appear more fully hereinafter from a consideration of the detailed description which follows, taken together with the accompanying claims and with the drawings wherein one embodiment of the invention is illustrated. It is to be expressly understood, however, that the drawings are for the purpose of illustration only and are not designed as a definition of the limits of the invention.

In the drawings wherein like numerals refer to like parts throughout the several views:

Figure 1 is a diagrammatic view of the device of the present invention showing the optical system, the scanning disc, the electric circuits and the indicator arrangement.

Figure 2 is an end view of the scanning disc showing two phases of the photocell circuit output with respect to two different paths of travel.

Figure 3 is illustrative of the photocell output frequency before amplification in accordance with one revolution of the scanning disc.

Figure 4 shows the output of the photocell after amplification thereof.

Figure 5 shows the voltage curve of the amplified photocell output circuit with respect to the generator voltage output, which output circuits are shifted out of phase by said rotating disc and a change in the focused path of travel and into phase by energization of the induction motor to rotate the generator stator.

Referring in detail to the drawings which disclose the preferred means for carrying out my method, the device comprises a suitable optical system 10 adapted to focus an image of the ground, while the aircraft is flying over a path of travel onto a rotating grid 12, as along the arrow lines in Figure 2.

The grid 12 is formed with parallel alternate opaque and transparent sections, the opaque sections being represented by numeral 13 and hereinafter referred to as the grid lines 13. Means are provided to rotate the grid 12 through gearing 14. Such means may be for example, an electric driving motor 15 connected to a suitable source of power adapted, through gearing 14, to rotate the grid 12 at a constant rate which is one half that of the motor 15.

Mounted on the shaft of motor 15 is a rotor 16 of a generator having a stator 17 adapted to be rotated by a two phase induction motor 20 one side of which is in the generator circuit $fG$. Motor 20 is in driving connection with stator 17 of the generator which produces one cycle per revolution of driving motor 15 for two cycles per revolution of grid 12. Stator 17 has secured thereto an indicator pointer 21. The pointer 21 upon rotation of the motor 20 and hence of stator 17, as hereinafter described, is positioned relative to its scale 22 to give measurements of the aircraft drift angle. If desired for control, a connection to a rudder, e. g., may be substituted for, or added to, pointer 21.

Suitably mounted near rotating grid 12 is a focusing lens 23 adapted to focus the ground image upon a photocell 24 to set up impulses whose frequency maxima occur at twice the frequency with which such image sweep is scanned by the grid 12. The impulse frequencies set up by said rotating grid 12 are at their maxima when the ground image sweeps at right angles to the grid lines 13 (see Figure 2) and occur twice for each rotation of the grid 12.

The effective frequency $f=vn \sin \theta$ cycles per second normally exists where the velocity is $v$ inches per second of the ground image relative to the grid, there are $n$ lines per inch of the grid, and angle $\theta$ exists between the direction of velocity $v$ (31) and that of the perpendicular (32) to the grid lines (13). This is the predominating frequency in spite of random impulses or "hash" and varies obviously with both altitude and the ground speed, which variation requires that with increasing $v$ over a working range there be a corresponding continuous change in the output of amplifier 28 which governs both the direction and speed of motor 20.

While the photocell 24 is shown as an elongated phototube with its axis parallel with the grid lines 13 and rotated with the grid 12, still under my invention the photocell 24 may be stationary and of a type, such as a selenium type disc, which is responsive to the total light reaching it from the grid.

Conductors 25 and 26 lead off from photocell 24 to a suitable filter 27. The filter 27 filters the photocell output $fC$, as shown in Figure 3, so as to pass most strongly the maximum frequency impulses focused onto the photocell 24 by rotating grid 12, as the ground image sweeps at its maximum velocity at right angles to grid lines 13. For example, this filter may include a capacitor 27a in line 26 and with an inductor 27b connected between lines 25 and 26, which in combination with the high resistance of the photocell 24 give a broadly tuned transfer effect with the peak at a frequency somewhat higher than the stated maximum frequency. Another filter, or additional filters, may be provided elsewhere, e. g. in lines 29 and 30 for the amplifier output, for the same purpose. The filtered photocell output is then conducted through the leads 25 and 26 to detector 28, the output, shown in Figure 4, is conducted through leads 29 and 30 to one phase of the two phase induction motor 20. The output preferably is of amplitude of the same order as that of the generator coils 17 and of a phase depending upon the change of angle of the path.

The detector 28 preferably includes an amplifying means 28a for the filtered output of the photocell and a transformer means 28b for the output of the amplifier so that a purely alternating voltage, at the cyclic frequency due to the rotation of grid 12, is imposed upon the terminals of lines 29 and 30. However, as is well known to workers in this art, an equivalent action to that of the transformer may be obtained by the alternative use of, e. g., blocking condensers, as long as there is the transformation of the photoelectric input of Figure 3 to the output of Figure 4.

It will now be apparent that the frequency of the output of photocell 24 varies, at any given altitude and speed relative to the ground (ground speed hereinafter) with the angle of the image-track relative to the strips of grid 12, being lowest when the track and strip are parallel and highest when in a normal relation since $f=vn \sin \theta$ as earlier noted.

The constant-speed rotation of grid 12 therefore sets up a sinusoidal variation, at twice the constant frequency of grid 12, of the effective frequency of the output of the photocell, taking the photocell output frequency as the dependent variable. In familiar terms, this is like the vibrato of a violin in which the frequency of the vibrato is the same as that of the oscillation of the violinist's finger (which corresponds with twice the speed of rotation of grid 12) regardless of the normal pitch of the note played (which corresponds with the effective frequency output of the photocell). This performance is shown by Figure 3.

Filter 27, diagrammatically shown, has an increased gain, i. e., ratio of output (to unit 28) to input (from photocell 24) for an increase of frequencies throughout the operating range.

The filtered input to amplifier 28 consists of cyclically varying effective frequency due to light crossing the rotating grid. This input is cyclically modulated in amplitude, by filter 27 and amplifier 28, at the frequency of the rotation of the grid. The voltage of unit 28 (to winding $fA$) is a purely alternating voltage at the cyclic frequency of twice that of the disc rotation and at a relative phase proportional to the drift angle $\theta$. As is well known, this result is produced by an ordinary amplifier of the conventional detector-type, i. e., one including (1) a triode, which always has a rectifying action, and also (2) a capacitor to provide a smoothing action. Accordingly, such a detector-type amplifier 28a is diagrammatically shown in Figure 1.

This cyclical phase relation of voltages across windings $fA$ and $fG$, shown in Figure 5, is used with a two-phase motor 20 which is connected to the generator coils 17 (and drift indicator 21) to reduce the phase difference to zero or null.

*Operation*

The two phase induction motor 20 as shown in Figure 1 and hereinbefore described is connected at one phase thereof with the generator circuit $fG$ and at the other phase thereof with the photocell output circuit $fA$ and is operated upon change in phase of circuit $fA$ with respect to circuit $fG$.

The driving motor 15 drives both grid 12 and generator rotor 16 and accordingly provides a constant frequency circuit or index voltage in circuit *f*G. The voltage in photocell output circuit *f*A is also alternating and of a constant frequency twice that of the grid speed. The output to *f*A is subject to shift in phase whenever there is a change in the position of the ground image sweep line relative to the heading. For example, note Figure 2, which represents such a shift of ground image sweep by arrows 31 and 32. Arrow 31 illustrates a synchronous condition wherein the circuits *f*A and *f*G are presumed to be in phase as for example, at the start of a flight and arrow 32 illustrates a non-synchronous or out of phase relation of the respective circuits, such as may occur during flight. Such shift of the ground image sweep shown by arrow 32, energizes two phase induction motor 20 and drives or rotates generator stator 17, until circuit *f*G is brought into phase with circuit *f*A, whereupon induction motor 20 is in effect de-energized. Obviously, when motor 20 stops, stator 17 of the generator stops also, thereby giving an indication, such as the drift angle of the aircraft with respect to heading through pointer 21 on the scale 22.

There is thus provided a normally balanced electrical system for indicating drift by a radiant energy condition responsive means including an element sensitive to radiations of the class including light, adapted to maintain balance in accordance with the craft's path of travel over the ground, until drift from heading occurs and the path of travel is shifted, whereby the system is thrown out of balance and an indication of such drift is given proportional to the amount of deviation from the craft's heading.

While only one embodiment of the invention has been illustrated and described, other changes and modifications, which will now appear to those skilled in the art, may be made without departing from the scope of the present invention. For example, in carrying out my method: For the rotating member driven by motor 15, one equivalent would be an oscillating member. For the two phase motor 20, a motor having three or more phases may be substituted. Also instead of measuring drift, another physical condition variable with time such as, e. g., temperature or pressure may be measured by setting up a frequency which cyclically varies with temperature and changing the cyclical phase angle to accordingly goven the operation of a polyphase motor. The same mechanism which operates the final element as pointer 21 could equally well operate a control member such as, e. g., a rudder, measuring and controlling instruments being within the same class. Where the word "gain" is used herein, including in the claims, it is intended to have the broad meaning of "sensitivity" or the "transfer ratio" of output to input, and need not have a value greater than unity. Reference is, therefore, to be had to the appended claims for a definition of the limits of the present invention.

What is claimed is:

1. In a drift indicating instrument, the combination of a photo-responsive A. C. circuit and a generated A. C. circuit normally in synchronism when an aircraft carrying the instrument follows a path of travel corresponding to a set heading, means responsive to drift of an aircraft from said corresponding path of travel and cooperating with a photo-responsive portion of said photo-responsive circuit adapted to alter the phase of the current in said photo-responsive circuit, and a polyphase induction means adapted to indicate the amount of drift of said aircraft from said previously mentioned set heading, the last-named means being electrically connected to the photo-responsive circuit to operate the last-named means when the current phase of said photo-responsive circuit is changed from synchronism.

2. In a drift measuring instrument for aircraft, the combination of a driving means, a circuit including a generator driven by said driving means to produce an alternating voltage in the circuit, a scanning means for producing light variations of a frequency depending upon its direction relative to that of the path of a scanned relatively moving image, the scanning means being also driven by the driving means in synchronism with the generator, an optical system adapted to focus an image of the ground across the plane of said scanning means; a network including a photocell located to receive the stated varying light from the scanning means to produce corresponding photoelectric variations, a filtering, detecting and amplifying means constructed to produce an output voltage varying directly with the frequency of the photoelectric variations, and a transformer means connected to provide an alternating output voltage of the same frequency as that in the generator circuit and with a phase difference proportional to the angular displacement of the path of the ground image with respect to the cycle of the scanning means; and a two phase induction indicator device operable upon a phase shift in one side relative to the other and having one side thereof in the network to be subjected to the stated alternating output voltage and the other side in the generator circuit whereby upon an alteration of the direction of the path of the ground image across the scanning means the phase of the stated alternating output in the network changes relative to that of the generator to thereby shift said indicator device in proportion to the stated direction alteration.

3. A drift indicating system for a mobile object, comprising a photocell, a scanning grid, and means adapted to focus an image of said object's path of travel onto the scanning grid, to produce light impulses in dependence upon the angle of the path relative to the scanning grid; means adapted to direct the light impulses from the scanning grid onto the photocell, an index alternating current circuit, a network electrically connected to the photocell, means including filter, detector and amplifier means in said network constructed to produce in a portion thereof an alternating output current of the same frequency as that in the index circuit and with a phase difference proportional to the angle between the scanned path and the heading of the mobile object, a two-phase motor having one phase-winding thereof in the index circuit and another phase-winding thereof in said network output portion, and means operated by said motor when the currents in said circuits are out of phase to indicate the drift of the mobile object from its heading.

4. Means for automatically making drift measurements, comprising a scanning grid having alternate non-transparent and transparent sections, a first means for sweeping an image of the path of travel onto said grid, a substantially constant speed drive for said grid; a second means associated with said grid adapted to generate an index alternating voltage of corresponding frequency and including a rotor operated by said drive and a stator; a third means in driving connection with said stator; and a fourth means including image-responsive means and demodulating means, adapted to produce an alternating voltage of the same frequency as the index voltage and with a phase difference proportional to the drift from the heading; said third means being electrically connected with said second means and said fourth means and adapted to be energized when a phase difference exists between the two stated voltages to rotate the stator to eliminate the phase difference whereby the angle of rotation of the stator is a measure of the drift.

5. Course responsive apparatus for aircraft and the like, comprising an electro-responsive indicating device, inductive means having a rotor connected to said indicating device and having a polyphase stator, means adapted to supply an alternating voltage to one phase-winding of said polyphase stator; and an electro-optical ground sighting system responsive to a path of travel over the ground adapted to supply voltage of the same frequency to another phase-winding of said polyphase stator and control the phase of said second voltage supply relative to that first-named in dependence upon the drift, whereby a change in the path of travel over the ground acts to energize said polyphase stator and drive said rotor to thereby displace said indicating device in accordance with the drift of the craft from said path of travel.

6. Apparatus for determining the drift angle of an aircraft, which comprises electro-optical means including a scanning grid and a photocell having a demodulated output circuit; another circuit including means adapted to supply alternating voltage in the last-named circuit independently of said photocell, means to rotate said scanning grid to provide an alternating voltage output in said output circuit in unison with the independent alternating voltage and with a phase difference proportional to the drift angle, a two phase induction motor electrically connected to each of said circuits to be energized thereby, ground focusing means coacting with said scanning means to vary the phase of said photocell output when the aircraft drifts from course to thereby energize said motor, and means associated with said motor and adapted to indicate the drift angle.

7. A system for determining the drift angle from the heading of an aircraft or the like, comprising a constant phase generator circuit and a variable phase photocell circuit, a two phase indicating system calculated for drift angle readings having each phase-winding thereof in circuit with a respective one of said circuits to be actuated upon a phase difference in said circuits, and means adapted to scanningly focus a ground image of an aircraft's line of travel onto said photocell at the same frequency as said constant phase circuit and, when the focused line of travel of the ground image shifts with respect to the heading, to throw said circuits out of phase to thereby proportionally displace said indicating system into phase with the aircraft's original focused line of travel with respect to said shifted focused line of travel to determine the drift angle of the craft.

8. Means for automatically determining drift angles of a movable object with respect to heading, comprising optical means adapted to focus a ground line image along a path of travel to a scanning means, said scanning means being so located as to be swept by said image line, a constant speed drive means adapted to rotate said scanning means whereby said ground line image sweeps across the scanning means to produce maximum frequency impulses twice for each rotation thereof, a photocell, means adapted to focus at least part of an image of said scanning means on said photocell, filter means for said cell output adapted to pass impulses from said scanning means with the gain increasing with the frequency, means including a detector and an amplifier for the last-mentioned impulses to produce an alternating output voltage of a frequency twice that of the scanning means and of a phase varying with the drift, generator means adapted to generate an index voltage of the same frequency as that of said output voltage, a polyphase induction motor with one phase-winding thereof in said photocell circuit and the other phase-winding thereof in said index voltage circuit of the generator means, drive means interconnecting said motor armature and the stator of said generator means, and an indicator associated with the stator of said generator means, whereby while a continued straight path of travel is followed with an unchanged sweep of the ground image across the scanning means the circuits of each phase of said induction motor are in phase and thereby produce zero torque at the induction motor armature, but when said path of travel deviates and said ground line image is thereby shifted with respect to said scanning means the phase difference between said photocell voltage and that for zero drift is likewise altered, whereupon zero torque in the induction motor is broken and the motor operates to rotate the stator of said generator means until the voltage of said generator means comes into phase with said photocell voltage and zero torque is thereby restored at a new in-phase relation to indicate drift angle on such suitable indicator member.

9. A system to determine drift of an aircraft from course comprising an index A. C. circuit of normally constant phase and a variable phase A. C. circuit, a polyphase indicating system responsive to variations in phase between said circuits, and radiant energy sensitive electrical rotating scanning means responsive to drift of the aircraft from course adapted to originate variations in phase in said variable phase circuit to displace said indicating system in proportion to the drift of the craft from course, said index circuit including means actuated by said indicating system to reduce the phase difference to null.

10. In combination with means for indicating drift of an aircraft or the like, a polyphase motor for driving said indicating means, means actuated by said motor for energizing one phase of said motor with normally constant-phase A. C., and light sensitive electrical means responsive to drift adapted to energize another phase of said motor, whereby, upon a change of drift, said light sensitive means varies the phase in the last-mentioned phase-winding of said motor to cause said motor to drive said indicating means and the first-mentioned phase-energizing means in proportion to said change of drift.

11. Measuring means responsive to an aircraft's path of travel comprising a light scanning means, means adapted to focus the ground image of said path lineally across the light scanning means for detecting the direction of said path, an electrical circuit having an alternating electrical condition therein with the frequency proportional to that of said scanning means and including light sensitive means adapted to energize the electrical circuit in accordance with impulses set up by said image path across the scanning means and filter means in said circuit and an amplifier together having gain increasing with frequency over a working range of said impulse frequencies, an index circuit operatively connected with said scanning means to have an alternating electrical condition in said index circuit maintained in unison with that in the first-named circuit, and a two phase indicator device having portions respectively interposed in each of said circuits, said device being adapted to remain inoperative when said circuits are in phase and, upon change in phase of one of said circuits with respect to the other, to operate in accordance with a relative change of phase set up by a change of direction of said lineal image path across the scanning means to thereby give suitable measurements.

12. An instrument of the class for measuring or controlling the value of a variable, comprising a movable final element, a polyphase motor operatively connected with said element for changing the latter's position and having a plurality of phase-windings for determining the direction of running of the motor and hence of motion of the element in accordance with the relative phases of an electrical condition in said phase-windings; a second motor, having a continuously rotating shaft; a first means, having one part continuously driven by said shaft to alternate the value of the electrical condition of one of said phase-windings at a frequency proportional to the speed of rotation of said shaft, and having another part operatively connected with the polyphase motor to be angularly movable thereby from a definite reference position to create a phase difference of the alternations from those for said definite reference position; a second means, having at least one rotatable part for setting up impulses with an effective frequency varying in accordance with the value of an angle between said part and a direction corresponding with the value of said variable, said last-named part being operatively connected with said shaft to be continuously driven thereby to cyclically vary said effective frequency at the same cyclical frequency as that of the electrical condition of the stated one of said phase-windings; and a third means, electrically connecting the second means with another of said phase-windings to continuously convert the instantaneous value of said effective frequency into a corresponding value of the electrical condition in another of said phase-windings, whereby both stated electrical condition values oscillate at the same frequency with their relative phase difference proportional to the value of said variable and operate the polyphase motor to reduce said phase difference to a value for stopping the operation.

13. The combination set forth in claim 12 in which the third means includes a filter having its gain change continuously in only one direction with an increase of frequency over the working range of the stated effective frequencies.

14. In an instrument of the class for measuring or controlling the value of a physical variable, the combination of a movable final element, a polyphase motor operatively connected with said element for changing the latter's position and having a plurality of phase-windings for determining the direction of running of the motor and hence of motion of the element in accordance with the relative phases of an electrical condition in said phase-windings, a first means for converting the value of said variable into A. C. of effective frequency cyclically varying with the phase difference of the actual cyclical variations of frequency and those for a reference value of the physical variable dependent upon the value of said variable, a second means electrically connected with one of said phase-windings for converting the variable frequency A. C. into A. C. of the same frequency and phase as for the stated cyclical variations, a third means electrically connected with another of said phase-windings for supplying thereto A. C. of the same frequency as for the first-mentioned phase-winding, and a fourth means operatively connecting said motor to the third means to actuate the latter to bring to a motor-stopping value any phase difference of the currents in the respective phase-windings.

15. In an instrument of the class for measuring or controlling the value of a physical variable, the combination of a movable final element, a first means for converting the value of said variable into A. C. of cyclically varying effective frequency with the phase of the actual cyclical variations relative to those for a reference value of the variable corresponding with the value of said variable, a second means for converting the variable-frequency A. C. into A. C. of the same frequency and phase as for the stated cyclical variations, and a third means, including a winding electrically connected with the second means, operatively connected with said element to position the latter in accordance with the phase of the A. C. in said winding relative to the A. C. output of the second means.

16. A normally balanced drift measuring system for an aircraft, comprising a motor, a generator for a first alternating voltage driven by said motor and including a movable part which is displaceable from a zero-drift position of said part to create a phase difference between the actual voltage and the voltage for the zero-drift position in accordance with the displacement, means for producing a second alternating voltage including an electro-optical means sensitive to the direction of the path of travel and a scanning means driven by said motor and cooperating with said electro-optical means to provide a second alternating voltage of a frequency proportional to that of the scanning means and the same as that of said first voltage but with a phase difference between the actual second voltage and the voltage for zero-drift dependent on the drift, means governed by said alternating voltages to move said movable part to bring the phase difference between the two actual voltages to a value which stops the movement, and means operatively associated with said generator part to measure changes in the direction of the path of travel of the aircraft.

HENRY KONET.

REFERENCES CITED

The following references are of record in the file of this patent:

UNITED STATES PATENTS

| Number | Name | Date |
|---|---|---|
| 2,013,594 | Zworykin | Sept. 3, 1935 |
| 2,240,680 | Stuart | May 6, 1941 |
| 2,176,742 | La Pierre | Oct. 17, 1939 |
| Re. 19,156 | Baughman | May 8, 1934 |